United States Patent
Adnet et al.

(10) Patent No.: US 6,623,712 B1
(45) Date of Patent: Sep. 23, 2003

(54) METHOD FOR DISSOLVING PLUTONIUM OR A PLUTONIUM ALLOY AND CONVERTING IT INTO NUCLEAR FUEL

(75) Inventors: Jean-Marc Adnet, Pujaut (FR); Jacques Bourges, Verrières-le-Buisson (FR); Pascal Bros, Saint Gervais (FR); Philippe Brossard, Villeneuve Lez Avignon (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/719,734

(22) PCT Filed: Jun. 17, 1999

(86) PCT No.: PCT/FR99/01459
§ 371 (c)(1),
(2), (4) Date: Dec. 15, 2000

(87) PCT Pub. No.: WO99/66086
PCT Pub. Date: Dec. 23, 1999

(30) Foreign Application Priority Data

Jun. 19, 1998 (FR) ............................. 98 07758

(51) Int. Cl.[7] .............................. C22B 60/00
(52) U.S. Cl. .............................. 423/20; 75/396; 420/2; 423/251; 976/DIG. 96
(58) Field of Search ............... 423/20, 251; 75/396; 976/DIG. 96, DIG. 409; 420/2; 376/308; 252/643, 638, 184, 364

(56) References Cited

U.S. PATENT DOCUMENTS

| | | | |
|---|---|---|---|
| 3,259,473 A | * 7/1966 | Hopkins, Jr. et al. | 423/251 |
| 3,821,091 A | * 6/1974 | Bilal et al. | 423/3 |
| 4,162,230 A | 7/1979 | Horwitz et al. | |
| 5,135,728 A | 8/1992 | Karraker | |
| 5,205,999 A | * 4/1993 | Willis et al. | 423/6 |

FOREIGN PATENT DOCUMENTS

| | | |
|---|---|---|
| DE | 32 25 199 | 1/1984 |
| EP | 0 312 433 | 4/1989 |
| FR | 2 212 610 | 7/1974 |
| FR | 2 352 779 | 5/1976 |
| GB | 978615 | 12/1964 |
| JP | 62 169745 A | 7/1987 |
| JP | 05100084 | 4/1993 |
| RU | 2 026 819 | 1/1995 |
| WO | 97/25721 | 7/1997 |

OTHER PUBLICATIONS

J. M. Cleveland, Plutonium Handbook, Chapter 13, Wick O. J. Ed. ANS Publication, 1980, no month.

A. S. Polyakov, et al., AIDA/MOX: Progress Report on the Research Concerning the Aqueous Process for Alloyed Plutonium Conversion to $PuO_3$ or $(U,Pu)O_2$, global 95, Versailles, France Sep. 11–14, 1995.

D. Karraker, Mechanism of Plutonium Metal Dissolution in $HNO_3$–HF–$N_2H_4$ Solution, DP–MS–85–45, Sep. 6, 1985.

R. D. Fox, report ARH–2203, Atlantic Richfield Hanford Company, 1971, no month.

* cited by examiner

Primary Examiner—Steven Bos
(74) Attorney, Agent, or Firm—Pearne & Gordon LLP

(57) ABSTRACT

The present invention relates to a process to dissolve plutonium or a plutonium alloy, by placing it in contact with an aqueous dissolution mixture, wherein said dissolution mixture comprises nitric acid, a carboxylic acid with complexing properties with respect to plutonium, and a compound comprising at least one —$NH_2$ radical such as urea.

The invention also relates to a process to convert plutonium or a plutonium alloy into plutonium oxide and to manufacture nuclear fuel from said oxide.

The invention particularly applies to the dismantling of plutonium contained in nuclear weapons with a view to its use in civilian nuclear reactors, particularly in the form of MOX fuel.

6 Claims, 1 Drawing Sheet

METHOD FOR DISSOLVING PLUTONIUM OR A PLUTONIUM ALLOY AND CONVERTING IT INTO NUCLEAR FUEL

The present invention relates to a plutonium or plutonium alloy dissolution process which uses a dissolution medium composed of a mixture of nitric acid, a carboxylic acid and an amino compound.

The field of the invention may generally be defined as that of the conversion of alloyed or non-alloyed plutonium into plutonium oxide, particularly within the scope of the dismantling of plutonium contained in nuclear weapons with a view to its use in civilian nuclear reactors, particularly in the form of MOX fuel.

However, the process according to the invention can clearly be used within the scope of any application requiring the conversion and transformation of plutonium or one of its alloys.

The use of plutonium obtained by dismantling nuclear weapons in the form of MOX fuel for civilian nuclear electricity requirements is indeed one of the options studied on a global level for the "excess" stocks declared by the USA and the Russian Federation, each amounting to approximately 50 tonnes. This is the purpose of the AIDA/MOXI programme defined in the French-Russian Intergovernmental agreement of 12$^{th}$ November 1992.

The plutonium obtained by dismantling nuclear weapons is generally plutonium alloyed with gallium (Ga) with a gallium content of up to 5% by weight.

Plutonium contained in nuclear weapons to be burned in civilian reactors is generally recovered according to a processing pattern organised around the following main steps: denaturation of plutonium, conversion of plutonium into $PuO_2$ oxide and, finally, manufacture of MOX fuel.

As regards the conversion step, known processes to convert alloyed plutonium into $PuO_2$ or into $(U,Pu)O_2$ can be classified into three main categories:

dry processes;

pyrometallurgic processes;

aqueous processes.

In all cases, irrespective of the type of process, the process must particularly comply with the following constraints:

risk control;

high gallium purification;

supply of sinterable oxide compatible with MOX fuel manufacture;

effluent and waste limitation.

The main difficulty converting alloyed plutonium into $PuO_2$ or into $(U,Pu)O_2$ lies in the first conversion steps such as dissolution which have not been validated industrially.

In recent years, numerous studies have been conducted in this area by the French and Russians and by the Americans.

Dry processes include the HYDOX process used in the United States for conversion into $PuO_2$.

This process comprises the two operating sequences: hydridation (HYD) of plutonium into $PuH_{2+x}$ and Ga, followed by oxidation (OX) of the hydride into oxide to produce plutonium oxide.

Both operations can be carried out either in the same apparatus or in two separate confinements which limits the risk related to the presence of the explosive mixture $H_2/O_2$.

The $PuO_2$ obtained from this treatment has the disadvantage of having a low sintering capacity and a high gallium contamination level.

Pyrometallurgic processes are based on the solubilisation of plutonium in a bath of molten chlorides followed by its conversion into $PuO_2$ or into $(U,Pu)O_2$, by chemical displacement or electrolysis. Any gallium present is eliminated by distillation in the form of $GaCl_3$ at the start of the process.

The sintering capacity of the $PuO_2$ obtained is subject to caution and the management of the waste induced is not defined. For this reason, pyrometallurgic processes have known no industrial applications.

Aqueous process conversion processes which firstly comprise a dissolution step offer the advantages of operating at low temperatures and requiring minimum research and development.

Indeed, apart from the actual dissolution, all the steps subsequently used to produce MOX fuel, such as purification of the plutonium generally in the form of plutonium nitrate in solution, conversion into sinterable oxide, fuel manufacture, are known and perfectly controlled, particularly in France.

Numerous dissolution media have been proposed for alloyed or non-alloyed plutonium.

In this way, metal plutonium is dissolved rapidly at ambient temperature, at a rate of 30 to 50 mg/min/cm$^2$ and with a good yield (98%) in a dissolution medium composed of sulphamic acid ($NH_2SO_3H$).

Dissolution takes place according to the following reaction:

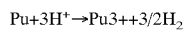
$$Pu+3H^+ \rightarrow Pu3++3/2H_2$$

Said sulphamic acid process has been used for 25 years in the United States at Savannah River and in France at Valduc to recycle certain metal or alloyed plutonium waste.

However, dissolution with sulphamic acid involves a number of risks meaning that it cannot be used in current or future reprocessing plants. Said risks are essentially chemical risks related to a significant release of hydrogen and the potential and uncertain formation of pyrophoric compounds and industrial environmental problems related to the difficulty managing the effluents generated containing sulphate ions.

Dissolution of alloyed plutonium in a nitric medium was firstly dismissed since it results in the formation (passivation phenomenon) of a layer of adherent plutonium oxide on the metal surface which prevents the chemical reaction from continuing, as described in the document by J. M. CLEVELAND "Plutonium Handbook", Chapter 13, WICK O. J Ed, ANS Publication, 1980.

Dissolution of alloyed plutonium with hydrochloric acid was studied in the document by A. S. POLYAKOV, J. BOURGES, A. BOESCH, E. CAPELLE, H. BERCEGOL, P. BROSSARD, P. BROS, B. SICARD and H. BERNARD "AIDA/MOX: Progress Report on the Research concerning the Aqueous Processes for alloyed Plutonium Conversion to $PuO_2$ or $(U,Pu)O_2$", Global 95, Versailles, France, 11–14 September 1995.

The use of a hydracide instead of an oxacide potentially prevents the oxidation of plutonium (III) into plutonium (IV) and eliminates the passivation phenomenon encountered in nitric medium. It is also possible to recycle HCl, by distillation, upstream from the process.

Experiments, conducted with 6 mol/l HCl, at ambient temperature, in a glass apparatus with identification of the type and measurement of the volume of gas released, demonstrated that 1.5 moles of hydrogen were produced per mole of plutonium dissolved, according to the reaction:

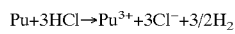
$$Pu+3HCl \rightarrow Pu^{3+}+3Cl^-+3/2H_2$$

with little residue produced ($\approx$2% by weight).

However, the dry insolubles are pyrophoric and the use of chloride ions appears to be difficult to manage on an industrial scale due to corrosion and effluent problems which have resulted in this process being abandoned.

Subsequently, dissolution in nitric medium of metal or alloyed plutonium was studied in-depth to remedy the disadvantages due to the formation of the passivating plutonium oxide layer.

In this way, the document by D. G. KARRAKER "Mechanism of Plutonium Metal dissolution in $HNO_3$—$HF$—$N_2H_4$ solution" DP-MS-85-45, Sep. 6, 1985 describes a process wherein the formation of the passivating layer is avoided by the use of a powerful reduction agent: hydrazine nitrate ($NH_2$—$NH_2$, $HNO_3$).

This process offers the advantage of solubilising α or β phase plutonium in nitric medium, with an acceptable rate (20 to 40 mg/min/cm$^2$) while reducing the release of hydrogen to a yield less than 3% ($H_2$/mole Pu)

However, the disadvantages of this process are that it uses undesirable fluoride ions ([HF]=0.1 M) for corrosion problems and generates compounds involving a chemical risk such as nitrohydric acid, $HN_3$ at a rate of $10^{-3}$ moles of $HN_3$ per mole of Pu.

An improvement to this process is described in the document U.S. Pat. No. 5,135,728, which relates to a plutonium, particularly delta phase plutonium, dissolution process, by heating a mixture of nitric acid, hydroxyl ammonium nitrate (HAN) instead of hydrazine, and potassium fluoride, and immersing the metal in said mixture. Due to the replacement of hydrazine nitrate by hydroxyl ammonium nitrate, said process does not induce any risk of nitrohydric acid formation, but it remains penalising in terms of waste, since it introduces fluoride ions.

Another nitric dissolution process is referred to as anodic dissolution described for example in the document by R. D. FOX report ARH-2203, Atlantic Richfield Hanford Company, 1971; the electrolyser where the metal plutonium is dissolved operates according to the solution/metal/electrode contact principle. The metal Pu is inserted between two electrodes immersed in a nitric solution and passing of DC current of 100 to 200 Amps results in the solubilisation of plutonium in the form of Pu(IV) nitrate. While the dissolution rates are of interest, close to 35 mg/min/cm$^2$, for example, said process is unable to prevent the formation of $PuO_2$ insolubles in spite of the addition of fluoride ions to the reaction medium.

Dissolution of alloyed plutonium by a fluoronitric mixture was also described, for example, in the document by A. S. POLYAKOV quoted above and was developed on a semi-industrial scale in Russia.

Said process consists of solubilising the metal plutonium with a boiling (105±3° C.) mixture of acids, 6 to 8 mol/l $HNO_3$ and 0.3 to 0.4 mol/l HF, in a special alloy dissolver.

The composition of the gases generated during the dissolution is on average as follows: NO=46±2%; $N_2$=28±3%; $NO_2$=23±1%; $N_2O$=2±0.1%; $H_2$=0.4±0.1%. This demonstrates the low fire and explosion risk. The instantaneous rates, measured at the start of dissolution, reach values of 315 mg/min/cm$^2$ for 6–8 mol/l $HNO_3$ and HF=0.35 mol/l at 105±3° C., with an activation energy of 218 kJ/mol.

After dissolution, the dissolution liquor is cooled to 60–90° C. and the dissolver is supplied with aluminium nitrate at a rate of 3 moles of Al per mole of fluoride ion in order to "mask" the fluoride ions and thus prevent any risk of corrosion in the rest of the process. Approximately 100 kg of alloyed plutonium has been dissolved at Ozersk (Russian Federation) using this method.

However, this process has disadvantages which have not been resolved and are an obstacle to its large-scale application.

Said disadvantages are essentially significant equipment corrosion despite the use of special alloys and an uncertain accumulation of $PuF_4$ precipitates at the base of the reactor which may represent an intense neutron source.

Another solution has been proposed to dissolve alloyed plutonium in nitric medium and prevent the reaction from being stopped by passivation. This consists of using a reducing medium such as an appropriate carboxylic acid, a good plutonium (III) stabiliser and compatible with nitric acid.

In this way, the document by A. S. POLYAKOV and B. SICARD already quoted above describes the use of a dissolution mixture composed of nitric acid and formic acid.

Dissolution tests of Pu-Ga alloyed specimens (1 to 3 g) were conducted in the laboratory, under aerobic conditions. The dissolution of the alloy by 3.6 to 2.8 mol/l $HNO_3$ and 2.7 to 7.5 mol/l HCOOH mixtures is not total; the yields are of the order of 80%. The insoluble dissolution residue, isolated and air-dried, did not demonstrate any pyrophoric properties and are easily dissolved by silver (II) electrogenerated in an electrolytic cell with separate compartments as known in the related art.

The reaction temperature and the surface condition of the specimen (varying degree of oxidation) are the two main parameters affecting this type of dissolution. The initial reaction kinetics (measured for ⅔ of solubilisation) fluctuates between 100 and 200 mg/min/cm$^2$ according to the mixtures of acids used. It is not sensitive to temperatures in excess of 40° C.

The on-line analysis of the gases generated during dissolution has made it possible to identify the following gases: $H_2$, $N_2$, NO, $CO_2$ and traces of CO, $N_2O$, $NO_2$ and $CH_4$.

The proportion of hydrogen in the dissolution gases remains low and is on average below the LEL (Lower Explosive Limit) even in the absence of flushing of the roof of the reactor with a neutral gas.

The reaction mechanism is complex and comprises several steps. The first of said steps uses the radical species H* obtained by a reaction between plutonium and nitric acid according to the following pattern:

$$Pu+3H^+ \rightarrow Pu^{3+}+3H^*$$

The radical hydrogen reacts, either with another radical to produce molecular hydrogen or with nitric acid to form nitrous acid.

The nitrous acid obtained in this way is the source of numerous chemical reactions, the most important of which are:

$$Pu+2HNO_2 \rightarrow PuO+2NO+H_2O$$

$$Pu+2HNO_2 \rightarrow PuO_2+2NO+H_2O$$

These reactions result in the formation of insoluble compounds.

Formic acid is adsorbed on the surface of the plutonium specimen to be dissolved and reacts with plutonium to form soluble complexes in nitric medium.

Formic acid also reacts with radical hydrogen and with the nitrous acid formed during dissolution, which limits the reactions resulting in insoluble formation.

However, the action of formic acid does not make it possible to achieve a quantitative dissolution of plutonium.

The purpose of the present invention is to provide a process to dissolve plutonium or a plutonium alloy which does not involve the drawbacks, limitations, deficiencies and disadvantages of the prior art and solves the problems of the processes according to the prior art.

The purpose of the present invention is also to provide a plutonium or plutonium alloy dissolution process which makes it possible to perform said dissolution with a high dissolution yield and rate, at a high safety, while controlling chemical and criticality risks and generating little or no effluents.

The purpose of the present invention is finally to provide a dissolution process compatible with the other plutonium conversion steps.

This and other purposes are achieved according to the present invention with a process to dissolve plutonium or a plutonium alloy, by placing it in contact with an aqueous dissolution mixture, wherein said dissolution mixture comprises nitric acid, a carboxylic acid with complexing properties with respect to plutonium, and a compound comprising at least one $-NH_2$ radical.

The incorporation of a compound comprising a $-NH_2$ radical in a dissolution mixture comprising a mixture of formic acid and nitric acid is not described or suggested in the prior art and surprisingly makes it possible to solve the problems posed by the dissolution mixture according to the prior art which comprises only nitric acid and formic acid.

In particular, it is possible with the process according to the invention to obtain, unexpectedly, a clearly improved dissolution rate and yield with reference to the process according to the prior art using a dissolution medium which does not comprise, as an additional reagent, a compound comprising at least one $-NH_2$ radical.

Apparently, without any link with any theory, the compound comprising at least one $-NH_2$ radical inhibits the formation of nitrous acid and renders the reactions resulting in the formation of insolubles produced in very small quantities negligible. This results in an increase not only in dissolution yields but also in the dissolution rate.

In addition to the very high dissolution rate and yield, said yield being possibly almost quantitative, the process according to the invention also offers other advantages such as obtaining at the end of the process a solution which is generally a plutonium nitrate solution in nitric medium which is totally compatible with conventional reprocessing processes such as the PUREX process.

Similarly, the insoluble residue generated in very small quantities by the process according to the invention can be easily dissolved with electrogenerated silver (II), which is a tried-and-tested industrial technique.

In addition, the process according to the invention does not generate secondary effluents that are difficult to process as is the case in some of the processes of the prior art, due to the presence of sulphate or fluoride ions in said effluents; finally, the process according to the invention is extremely safe both in chemical terms—due to the low hydrogen content of the gases produced during dissolution and the absence of pyrophoric compounds—and nuclear terms, due to the elimination of any criticality risk in the process.

The carboxylic acid used in the process according to the invention is an acid with complexing properties with respect to plutonium.

Most carboxylic acids show these properties to varying degrees. Advantageously, the carboxylic acid should be chosen from formic acid, oxalic acid, ascorbic acid, glycolic acid, tartaric acid and their mixtures.

The preferred acid is formic acid.

The compound comprising at least one $-NH_2$ radical is not limited and may be any compound comprising at least one $-NH_2$ radical and which shows an anti-nitrous or $HNO_2$-antagonist effect.

The reaction which takes place generally between nitrous acid and the amino compound is in fact as follows:

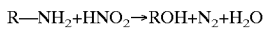

$$R-NH_2 + HNO_2 \rightarrow ROH + N_2 + H_2O$$

For example, the compound comprising an $-NH_2$ radical may be chosen from urea, hydrazine, hydroxylamine and their mixtures; urea is preferred.

The nitric acid concentration in the mixture is generally 1 to 15 mol/l, the concentration of compound comprising an $NH_2$ radical is generally 0.2 to 1.0 mol/l and the carboxylic acid concentration is generally 1 to 8 mol/l.

Therefore, a preferred mixture will be composed of nitric acid at a rate of 1 to 15 mol/l, formic acid at a rate of 1 to 8 mol/l and urea at a rate of 0.2 to 1.0 mol/l.

The dissolution process is generally performed at a temperature chosen in the range from ambient temperature to the mixture's boiling point, preferentially, however, it is advisable to operate below, or even more preferentially, slightly below, the mixture's boiling point to avoid being in the presence of nitrous vapours and reduce reagent consumption.

Therefore, the process should be performed in the vicinity of 60 to 90° C. below the mixture's boiling point.

The temperature at which the dissolution process is performed is, for example, from 20 to 90° C., preferentially from 30 to 70° C.

The process according to the invention applies equally to non-alloyed metal plutonium and to plutonium alloys.

Said plutonium alloys may all be known plutonium alloys, with a metal chosen, for example, from Gallium, Scandium, Indium, Aluminium, Cerium and Americium.

The process according to the invention applies advantageously to plutonium alloyed with gallium, with a gallium content of up to 5% by weight, which is the alloy obtained by dismantling nuclear plants.

The metal plutonium or plutonium alloy liable to be dissolved by the process according to the invention may be of any type and any origin. It may particularly consist of, as mentioned above, plutonium obtained by dismantling nuclear plants and cleaning associated installations, but it may also consist of batches of Pu used for analytical purposes.

The dissolution process according to the invention may be incorporated in a process to convert plutonium or a plutonium alloy into plutonium oxide $PuO_2$, and more generally in a process to transform plutonium or a plutonium alloy into nuclear fuel such as MOX fuel.

Therefore, the invention also relates to a process to convert plutonium or a plutonium alloy into plutonium oxide comprising the following successive steps:

dissolution of the plutonium or plutonium alloy using the dissolution process described above;

purification by extraction of the plutonium nitrate solution in nitric medium obtained from the dissolution step.

Said extraction may particularly be performed using a chemical extraction process such as the PUREX® or similar process.

conversion of plutonium nitrate into $PuO_2$.

The conversion to $PuO_2$ may be performed using any conventional process, e.g. by oxalic precipitation.

The manufacture of the $PuO_2$-based nuclear fuel such as MOX fuel then also comprises a step consisting of preparing the nuclear fuel using a known process such as the COCA process or the MIMA process making it possible to obtain fuel pellets from $PuO_2$ and possibly $UO_2$ powder.

It should be noted that the $PUO_2$ obtained using the conversion process according to the invention, i.e. with a conversion process using a specific dissolution step according to the invention, offers characteristics making it particularly suitable for the sintering encountered in fuel pellet manufacturing processes.

Finally, the invention relates to an aqueous dissolution mixture comprising 1 to 15 mol/l of nitric acid, 1 to 8 mol/l of formic acid and 0.2 to 1.0 mol/l of urea.

The invention's other characteristics and advantages will be seen more clearly in the following description, which is illustrative and not restrictive, with reference to the appended figures wherein.

The invention will now be described with reference to the following Examples which are illustrative and not restrictive.

EXAMPLE 1

In this Example, a plutonium specimen weighing 1.568 g was dissolved using a process according to the prior art, using a dissolution medium composed of 3.2 M nitric acid and 5.2 M formic acid, at a temperature of 30° C.

EXAMPLE 2

In this Example, a plutonium specimen weighing 0.995 g was dissolved using the process according to the invention, using a dissolution medium composed as in Example 1 of 3.2 M nitric acid and 5.2 M formic acid, at a temperature of 30° C., but the mixture also comprised, according to the invention, urea at a rate of 0.3 M.

In each of the Examples 1 and 2, the gases generated during dissolution were analysed on-line and the progression of the hydrogen and nitrogen monoxide content of the dissolution gases was monitored.

Figure 1:
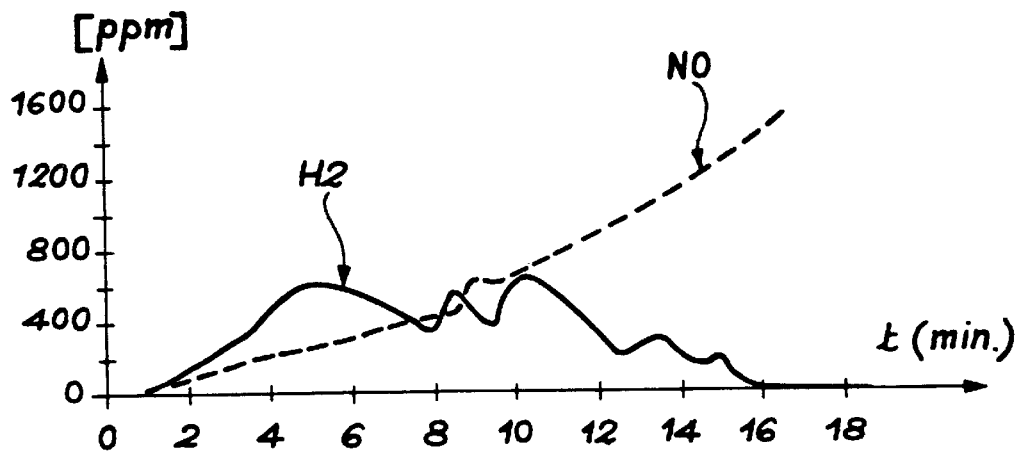
FIG. 1 is a graph representing the progression of the $H_2$ (full line curve) and NO (dotted line curve) content in ppm, as a function of time, of the dissolution gases obtained for the dissolution of a specimen of plutonium, according to the prior art (Example 1).
Figure 2:
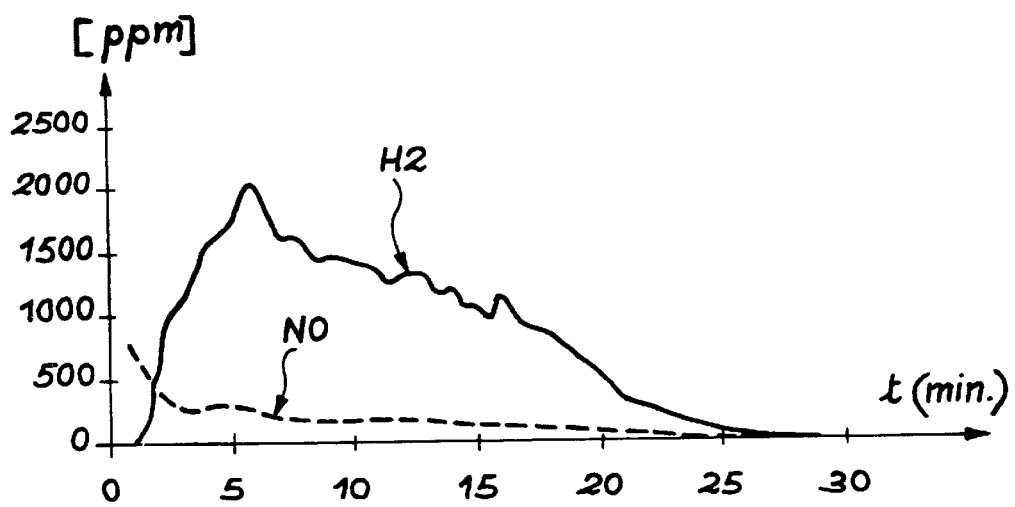
FIG. 2 is a graph representing the progression of the $H_2$ (full line curve) and NO (dotted line curve) content in ppm, as a function of time, of the dissolution gases obtained for the dissolution of a specimen of plutonium, according to the invention (Example 2).

FIGS. 1 and 2 are graphs indicating the contents (expressed in ppm) of $H_2$ (full line curve) and NO (dotted line curve) of the dissolution gases as a function of time (expressed in minutes) for the dissolutions of Examples 1 (prior art) and 2 (according to the invention), respectively.

In these figures, it is observed that when the dissolution is performed, according to the invention, in the presence of urea, the NO released is limited, demonstrating that little or no nitrous acid is formed.

Indeed, NO is the gaseous product of the dismutation reaction of nitrous acid according to the pattern:

$3HNO_2 \leftrightarrow HNO_3 + 2NO + H_2O$

Due to the inhibition of nitrous acid by urea, the actions resulting in the formation of insolubles become negligible inducing not only an increase in the dissolution yield but also in the dissolution rate.

The results obtained for the dissolution yield and rate are given in table I:

TABLE I

|  | Example 1 | Example 2 |
|---|---|---|
| Dissolution rate (mg/cm$^2$/min) | 27 | 55 |
| Dissolution yield (%) | 78 | 95 |

Although the dissolution rates do not seem to be very high—this is above all due to the surface condition of the specimen before the reaction which was highly oxidised for both these Examples—a significant increase in the rate (of a factor of 2) and yield (which is increased by 17%) was measured for Example 2, performed according to the invention in the presence of urea.

With specimens subject to low surface oxidation, dissolution rates between 100 and 200 mg/min/cm$^2$ are obtained.

What is claimed is:

1. Process to dissolve plutonium or a plutonium alloy, by placing said plutonium or plutonium alloy in contact with an aqueous dissolution mixture, wherein said dissolution mixture comprises 1 to 15 mol/l of nitric acid, 1 to 8 mol/l of formic acid, and 0.2 to 1.0 mol/l of urea.

2. Process according to claim 1 wherein the dissolution is performed at a temperature chosen in the range from ambient temperature to the dissolution mixture's boiling point.

3. Process according to claim 2, wherein the dissolution is performed at a temperature of 20 to 90° C.

4. Process according to claim 1, wherein said plutonium alloy is a plutonium alloy comprising plutonium and a metal selected from the group consisting of gallium, scandium, indium, aluminum, cerium and americium.

5. Process to convert plutonium or a plutonium alloy into plutonium oxide comprising the following successive steps:
   a step of dissolution of the plutonium or plutonium alloy using the dissolution process according to claim 1, whereby the plutonium is dissolved to form a plutonium nitrate solution;
   a step of purification by extraction of the plutonium nitrate solution in the dissolution mixture obtained from the dissolution step, whereby plutonium nitrate is extracted;
   a step of conversion of the extracted plutonium nitrate into plutonium oxide.

6. Nuclear fuel manufacturing process from plutonium or a plutonium alloy comprising the conversion of the plutonium or plutonium alloy into plutonium oxide by the conversion process according to claim 5, followed by the preparation of the nuclear fuel from a powder of said plutonium oxide.

* * * * *